United States Defensive Publication [19] (H) [11] T957,010

Ballard et al. [43] Apr. 5, 1977

[54] SEPARATION OF DILUENT FROM POLYMERIZATION REACTION MIXTURE

[75] Inventors: Denis George Harold Ballard; Eric Jones, both of Runcorn, England

[73] Assignee: Imperial Chemical Industries Limited, London, England

[21] Appl. No.: 664,986

[22] Filed: Mar. 8, 1976

[30] Foreign Application Priority Data

Mar. 7, 1975 United Kingdom ..... 9561/75

[51] Int. Cl.[2] ..... C08F 6/10; C08F 6/00

[52] U.S. Cl. ..... 526/130; 526/154; 528/486; 528/487; 528/492; 528/494; 528/500

[57] ABSTRACT

A process for the separation of diluent from an ethylene polymerization reaction mixture wherein ethylene is copolymerized using as a catalyst an organo-metallic compound supported on an inorganic material. Subsequent to reaction, there is added to the reaction mixture a wetting agent and the diluent is then removed from the reaction mixture by steam distillation to give a product having significant solubility in the diluent.

A wide variety of wetting agents may be used, which may be either water-soluble or water-insoluble. However, water soluble wetting agents are much preferred, so that most or at least some of the wetting agent remains in the aqueous phase at the end of the steam distillation step. The wetting agent may also possess hydrocarbon solubility; but this does not appear to be of paramount importance. It should also be stable at the steam distillation temperature and should have low steam volatility. It is also convenient if the wetting agent is biodegradable to alleviate effluent disposal problems.

Examples of wetting agents include water soluble salts of di(hydrocarbyl) sulphosuccinic acids; poly(ethylene oxides) terminated with branched fluorocarbon groups, adducts of linear alcohols with ethylene oxide, and block copolymers of ethylene oxide and propylene oxide.

In general concentrations of wetting agent in the range 0.005 to 0.10% weight/volume, calculated on diluent, are suitable. Preferred concentrations are generally in the range 0.01 to 0.06% weight/volume.

16 Claims, No Sheets Drawing,

28 Pages Specification

The file of this unexamined application may be inspected and copies thereof may be purchased (849 O.G. 1221, Apr. 9, 1968).